W. Heppenstall.
Hoop Skirt.
No. 2,634. Fig. 2. Reissued June 4. 1867.
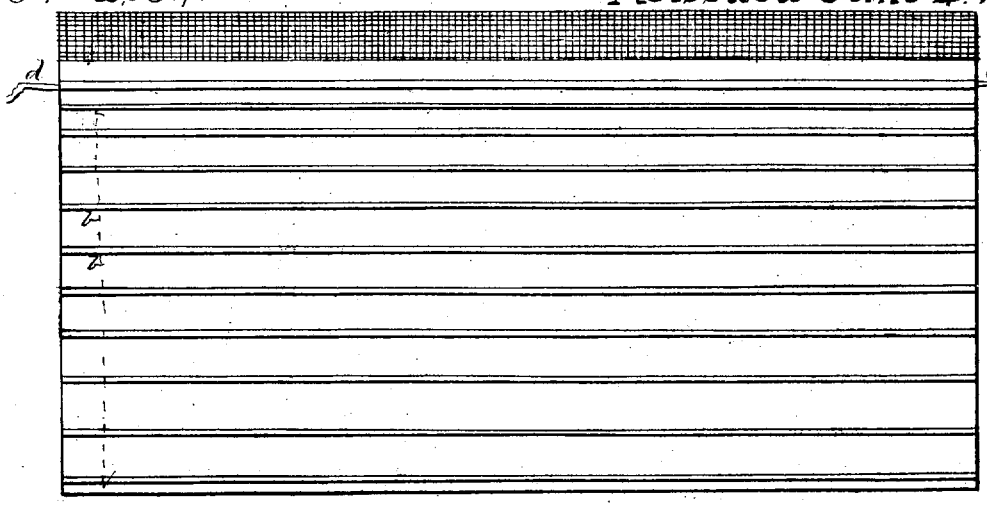
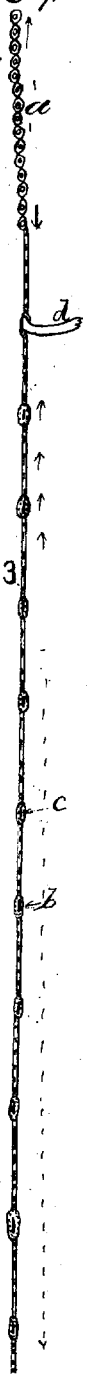
Fig. 3
Fig. 1.
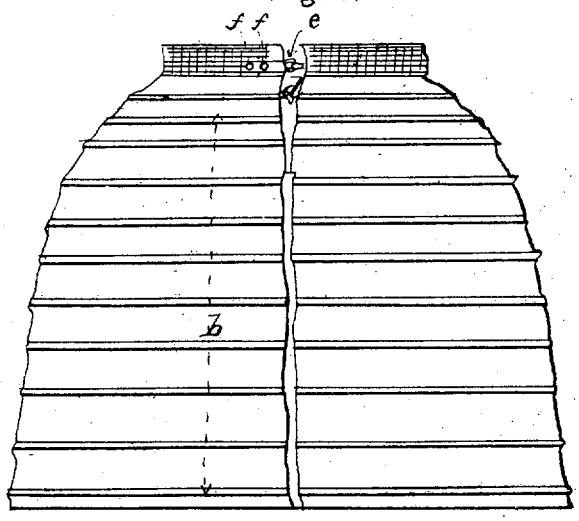
Fig. 4.
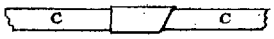
Fig. 5.
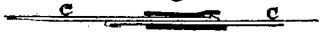
Witnesses.
Edward M. Bliss
Jonny W. Bujs
Inventor.
William Heppenstall.

United States Patent Office.

J. E. LUCAS, J. P. AREY, AND CHARLES G. HOWARD, OF SPRINGFIELD, MASSACHUSETTS, ASSIGNEES BY MESNE ASSIGNMENTS OF WILLIAM HEPPENSTALL.

*Letters Patent No.* 30,534, *dated October* 30, 1860; *reissue No.* 2,634, *dated June* 4, 1867.

IMPROVEMENT IN SKIRTS.

The Schedule referred to in these Letters Patent and making part of the same.

TO ALL WHOM IT MAY CONCERN:

Be it known that the following is a full, clear, and exact description of a certain new and useful Improvement in Skirts, invented by WILLIAM HEPPENSTALL, late of Springfield, in the county of Hampden, and State of Massachusetts, but now deceased, reference being had to the accompanying drawing, forming part of this specification, and in which—

Figure 1 represents a hoop-skirt constructed according to this improvement, showing the same as applied to a skirt having a waistband woven into the selvedge of the fabric.

Figure 2, a longitudinal view of a piece cut off from the fabric as taken from the loom.

Figure 3, an enlarged end view of the piece represented in fig. 2; and

Figures 4 and 5, side and edge views, in illustration of fig. 2, of the hoops, lap of the hoops, and a manner of securing them, but to which no claim is made.

Like letters indicate corresponding parts.

This improvement relates to a woven skirt made with pockets for reception of the hoops, and the nature of the invention consists in the production of a woven skirt, having hoops or wires inserted into woven pockets, also having draw-strings or threads woven into the web, and composed of larger or stouter warp-yarn than that of which the main body of the web or webs generally is formed.

Referring to the accompanying drawing, showing the improvement by way of illustration as applied to a skirt having a waistband woven into the selvedge of the fabric, *a* is the waistband, or it is or may be the selvedge of the cloth or fabric, and in which portion are represented as arranged the ends of the hereinbefore referred to larger or stouter warp-yarn or threads, and which may, where a waistband woven into or with the skirt is used, compose the warp of the latter, the object of such threads being to form draw-strings for drawing up the contracted or contracting portion of the skirt to the required shape and size. Openings *b* are or may be also formed in the ordinary way for receiving the hoops *c*. *b* shows the openings formed and interspersed at different distances or intervals in the fabric for the insertion of hoops, and it is proposed to intersperse among the warp-threads, more or less in number, through the entire width of the fabric, larger and stronger threads, and weaving them into and making them a part of the fabric itself, so that they may be used for drawing the garment to the required shape and size. The remaining part of the cloth or fabric should be closely woven, much in the ordinary way. The width of the fabric determines the length of the garment. *c* shows the end of the hoops; *e* shows hooks and eyes for securing the garment around the waist. *f* are eyelet-holes to receive the hooks for taking up the band shorter.

By this improvement in skirts, the cloth may be gathered to a suitable size or shape, and by the insertion of the hoops *c* the extension of the garment may be adjusted to produce the or any desired prominence in its shape and appearance. By it many or all objections previously raised to or against skeleton skirts are removed, while it possesses the requisite qualities of or relating to extension, form and shape, and desirableness of style and taste to suit those who may be termed fastidious. Skirts may also, according to this improvement, be made cheaply, easily, and rapidly by even ordinary machinery, and comparatively low-priced help or labor, and will be found superior to other skirts cut from out of a fabric woven for the purpose and provided with openings or pockets, and furnished with draw-strings or threads.

What is here claimed as new and useful, is—

A woven skirt, having hoops or wires inserted into woven pockets, and having woven into the weft draw-strings or threads composed of larger or stouter warp-yarn than that of which the web generally is formed, substantially as specified.

J. E. LUCAS,
J. P. AREY,
CHAS. G. HOWARD.

Witnesses for LUCAS AND HOWARD:
F. H. BERRY,
GIDEON WELLS.

Witnesses for J. P. AREY:
J. W. COOMBS,
G. W. REED.